US011395972B2

(12) United States Patent
Kurabayashi (10) Patent No.: US 11,395,972 B2
(45) Date of Patent: Jul. 26, 2022

(54) SYSTEM, SERVER, PROGRAM, AND METHOD FOR DETECTING CHEATING BY USER IN GAME (71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 109 days.

(21) Appl. No.: 17/085,030

(22) Filed: Oct. 30, 2020

(65) Prior Publication Data
US 2021/0046384 A1 Feb. 18, 2021

Related U.S. Application Data (63) Continuation of application No. PCT/JP2019/016665, filed on Apr. 18, 2019.

(30) Foreign Application Priority Data

May 1, 2018 (JP) .............................. JP2018-088223

(51) Int. Cl.
A63F 13/75 (2014.01)
A63F 13/23 (2014.01)
(Continued)

(52) U.S. Cl.
CPC .............. A63F 13/75 (2014.09); A63F 13/23 (2014.09); A63F 13/352 (2014.09); G06F 9/45558 (2013.01); G06F 2009/45595 (2013.01)

(58) Field of Classification Search
CPC ....... G06F 2009/45595; G06F 9/45558; A63F 13/352; A63F 13/23; A63F 13/75
See application file for complete search history.

(56) References Cited

U.S. PATENT DOCUMENTS 8,302,199 B2 10/2012 Bamberger et al.
9,616,338 B1 * 4/2017 Hooper ................. A63F 13/497
(Continued)

FOREIGN PATENT DOCUMENTS

JP 2006-6473 A 1/2006
JP 2014-35744 A 2/2014

OTHER PUBLICATIONS

International Search Report issued in Application No. PCT/JP2019/016665, dated Jul. 9, 2019 (4 pages).
(Continued)

Primary Examiner — Reginald A Renwick
(74) Attorney, Agent, or Firm — Osha Bergman Watanabe & Burton LLP (57) ABSTRACT Provided is a system including: a user terminal that executes a game program for playing a game, that determines a parameter for executing a certain event in the game, and that executes the event on the basis of the parameter to generate a user result; a result-for-verification generation unit that generates a plurality of virtual instances for virtualizing the user terminal, that executes the game program in a headless mode in the plurality of virtual instances, that selects, from the plurality of virtual instances, a virtual instance for executing the event on the basis of the parameter received by a server, and that executes the event in the selected virtual instance on the basis of the parameter to generate a result for verification; and a cheat verification unit that compares the user result with the result for verification to determine whether or not cheating has been conducted at the user terminal.

11 Claims, 6 Drawing Sheets (51) Int. Cl.
*A63F 13/352* (2014.01)
*G06F 9/455* (2018.01)

(56) References Cited

U.S. PATENT DOCUMENTS

| | | | | |
|---|---|---|---|---|
| 2004/0127277 | A1* | 7/2004 | Walker | H04L 63/08 |
| | | | | 463/16 |
| 2005/0288103 | A1 | 12/2005 | Konuma | |
| 2006/0178187 | A1* | 8/2006 | Walker | G07F 17/32 |
| | | | | 463/16 |
| 2007/0276521 | A1* | 11/2007 | Harris | A63F 13/75 |
| | | | | 709/224 |
| 2010/0227678 | A1* | 9/2010 | Konishi | A63F 13/75 |
| | | | | 463/29 |
| 2019/0168125 | A1* | 6/2019 | Haile | A63F 13/35 |

OTHER PUBLICATIONS

Written Opinion issued in International Application No. PCT/JP2019/016665, dated Jul. 9, 2019 (4 pages).
Notice of Reasons for Refusal issued in Japanese Application No. 2018-088223, dated Aug. 27, 2018 (6 pages).

* cited by examiner

(a) NORMAL MODE (b) HEADLESS MODE

SYSTEM, SERVER, PROGRAM, AND METHOD FOR DETECTING CHEATING BY USER IN GAME

TECHNICAL FIELD

The present invention relates to systems, servers, programs, and methods for detecting cheating by a user in a game.

BACKGROUND ART

Recently, online games of the type that is run on a general-purpose electronic device, such as a smartphone or a PC, and that communicates with a server via an open network are widely available. For the type of game utilizing a native app, with which graphical effects and sound effects closely coordinated with the game logic constitute an attractive feature, it is necessary to implement most of the game logic on the client side in order to closely coordinate these effects with the game logic. This is because, in the case where the game logic is implemented on the server side, communication with the server side is constantly required before and after rendering the effects, the client becomes less responsive, and congestion of requests occur on the server side.

With games of this type, since a program that controls the game logic is implemented on the client side, there is a problem of susceptibility to cheating in which data tampered with by modifying an app itself, modifying the content of a client-side memory or the content of communication, etc. is sent to the server side. Patent Literature 1 discloses a technology for detecting modification of a game program by performing a memory scan or the like.

CITATION LIST

Patent Literature

{PTL 1}
U.S. Pat. No. 8,302,199

SUMMARY OF INVENTION

Technical Problem

In the case where the method disclosed in Patent Literature 1 is used, however, it is necessary to create a special program for scanning memory, and in the case where the game program is updated, the special program must also be updated in accordance with the update, and thus the costs for continuing maintenance are high, and suitable cheat detection might be hindered by reverse engineering. Thus, an effective method against illegitimate tampering of game data on the client side has not yet been established.

Solution to Problem

The present invention has been made in view of the problem described above, and has the following features. Specifically, a system according to an aspect of the present invention is a system for detecting cheating by a user in a game played at a user terminal, the system including: a user terminal that executes a game program for playing a game, that determines a parameter for executing a certain event in the game, that sends the parameter, that executes the event on the basis of the parameter to generate a user result, which is the result of the event, and that sends the user result; and a server including a result-for-verification generation unit and a cheat verification unit, wherein the result-for-verification generation unit generates a plurality of virtual instances for virtualizing the user terminal, executes the game program in a headless mode in the plurality of virtual instances, selects, from the plurality of virtual instances, a virtual instance for executing the event on the basis of the parameter received by the server, and executes the event in the selected virtual instance on the basis of the parameter to generate a result for verification, and wherein the cheat verification unit compares the user result received from the user terminal with the result for verification to determine whether or not cheating has been conducted at the user terminal.

The result-for-verification generation unit may execute the event to generate the result for verification while disabling at least graphics processing and sound processing by executing the game program in the headless mode.

When performing selection from the plurality of virtual instances, virtual instances may be identified on the basis of type information including information indicating the kinds of game programs executed by the virtual instances and information indicating directories mounted in the virtual instances, and a virtual instance that has the same type information as the game program executed at the user terminal and that generates the same result as the game program when the same parameter as the parameter for the game program is input may be selected.

The result-for-verification generation unit may include a single virtual-instance management unit, the result-for-verification generation unit may cause the plurality of virtual instances to be run in parallel, the single virtual-instance management unit of the result-for-verification generation unit may determine the operation statuses of virtual instances on the basis of input/output interrupt signals from the virtual instances, thereby making it possible to execute an event on the basis of a parameter received by a virtual instance selected from the plurality of virtual instances while selecting another virtual instance and executing an event in parallel on the basis of another received parameter.

The virtual instances may realize container-based virtualization.

The server may include a load balancer and a plurality of result-for-verification generation units, each of the result-for-verification generation units may include a single virtual-instance management unit, the load balancer may assign the execution of the event based on the received parameter to one of the result-for-verification generation units, and the single virtual-instance management unit may search for available virtual instances in the result-for-verification generation unit including the single virtual instance and may select one of the available virtual instances as a virtual instance that executes the event assigned to the single result-for-verification generation unit.

Furthermore, a server according to an aspect of the present invention is a server used in a system for detecting cheating by a user in a game played at a user terminal, wherein the user terminal in the system executes a game program for playing a game, determines a parameter for executing a certain event in the game, sends the parameter, executes the event on the basis of the parameter to generate a user result, which is the result of the event, and sends the user result, and the server generates a plurality of virtual instances for virtualizing the user terminal, executes the game program in a headless mode in the plurality of virtual instances, selects, from the plurality of virtual instances, a virtual instance for executing the event on the basis of the parameter received by the server, and executes the event in the selected virtual instance on the basis of the parameter to generate a result for verification in order to determine whether or not cheating has been conducted at the user terminal by comparing the result for verification with the user result.

Whether or not cheating has been conducted at the user terminal may be determined by further comparing the user result received from the user terminal with the result for verification.

Furthermore, a program according to an aspect of the present invention is a program executed by a server in a system for detecting cheating by a user in a game played at a user terminal, wherein the user terminal in the system executes a game program for playing a game, determines a parameter for executing a certain event in the game, sends the parameter, executes the event on the basis of the parameter to generate a user result, which is the result of the event, and sends the user result, the program causing the server to execute: a step of generating a plurality of virtual instances for virtualizing the user terminal, a step of executing the game program in a headless mode in the plurality of virtual instances, a step of selecting, from the plurality of virtual instances, a virtual instance for executing the event on the basis of the parameter received by the server, and a step of executing the event in the selected virtual instance on the basis of the parameter to generate a result for verification in order to determine whether or not cheating has been conducted at the user terminal by comparing the result for verification with the user result.

A method executed in a system according to an aspect of the present invention is a method executed in a system for detecting cheating by a user in a game played at a user terminal, wherein the user terminal executes a game program for playing a game, determines a parameter for executing a certain event in the game, sends the parameter, executes the event on the basis of the parameter to generate a user result, which is the result of the event, and sends the user result, wherein a result-for-verification generation unit generates a plurality of virtual instances for virtualizing the user terminal, executes the game program in a headless mode in the plurality of virtual instances, selects, from the plurality of virtual instances, a virtual instance for executing the event on the basis of the parameter received by a server, and executes the event in the selected virtual instance on the basis of the parameter to generate a result for verification, and wherein a cheat verification unit compares the user result received from the user terminal with the result for verification to determine whether or not cheating has been conducted at the user terminal.

Furthermore, a method executed by a server according to an aspect of the present invention is a method executed by a server in a system for detecting cheating by a user in a game played at a user terminal, wherein the user terminal included in the system executes a game program for playing a game, determines a parameter for executing a certain event in the game, sends the parameter, executes the event on the basis of the parameter to generate a user result, which is the result of the event, and sends the user result, and wherein the server generates a plurality of virtual instances for virtualizing the user terminal, executes the game program in a headless mode in the plurality of virtual instances, selects, from the plurality of virtual instances, a virtual instance for executing the event on the basis of the parameter received by the server, and executes the event in the selected virtual instance on the basis of the parameter to generate a result for verification in order to determine whether or not cheating has been conducted at the user terminal by comparing the result for verification with the user result.

Advantageous Effects of Invention

The present invention makes it possible to readily realize high-speed cheat detection by executing a game program in a headless mode at a server.

DESCRIPTION OF EMBODIMENTS

Figure 1:
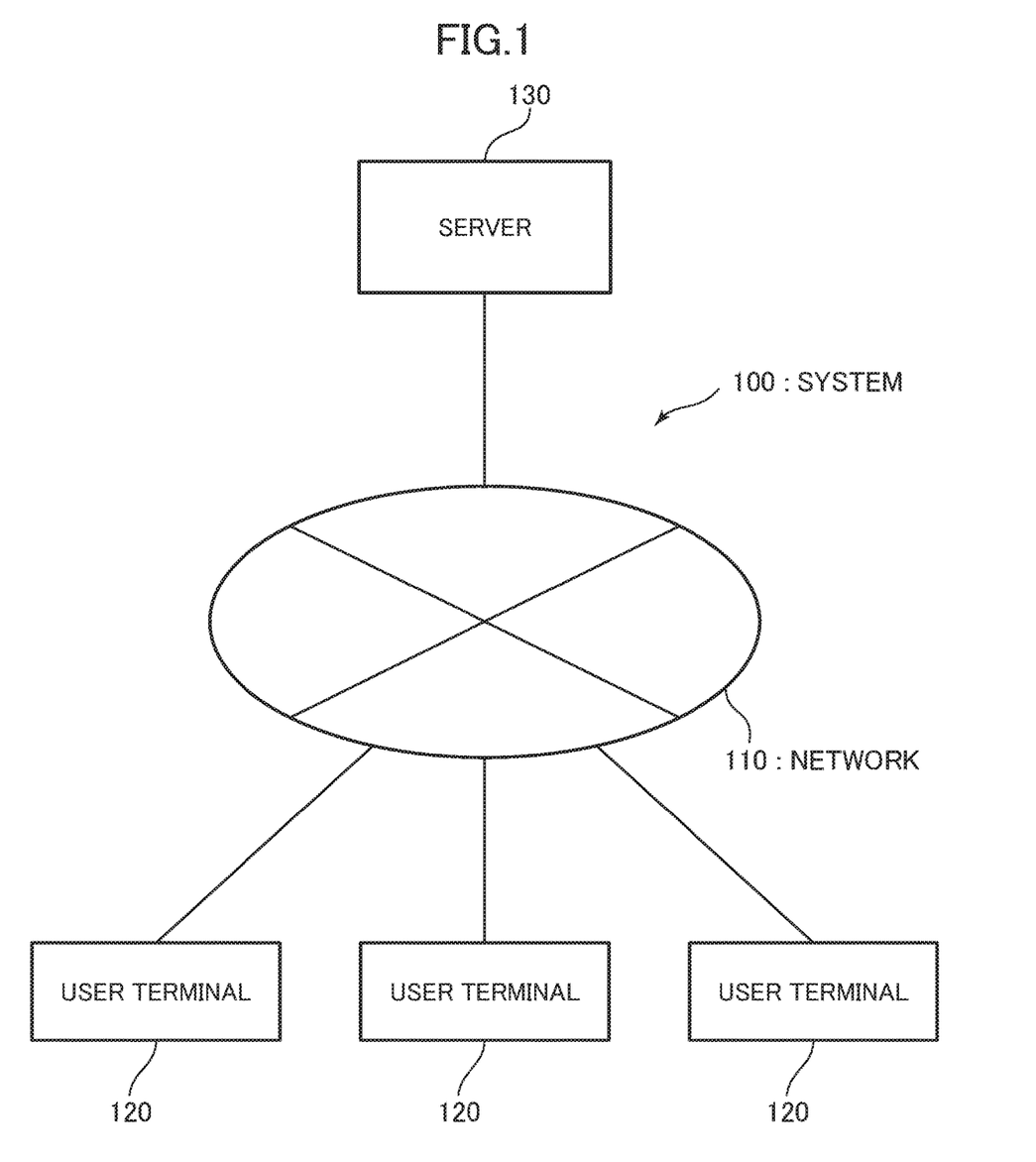
FIG. 1 shows the overall configuration of a system according to an embodiment of the present invention.

Now, an embodiment of the present invention will be described with reference to the drawings. As shown in FIG. 1, a cheat detection system 100 according to this embodiment can be realized by a system including one or more user terminals 120 (clients) and a server 130 connected via a network 110.

Figure 2:
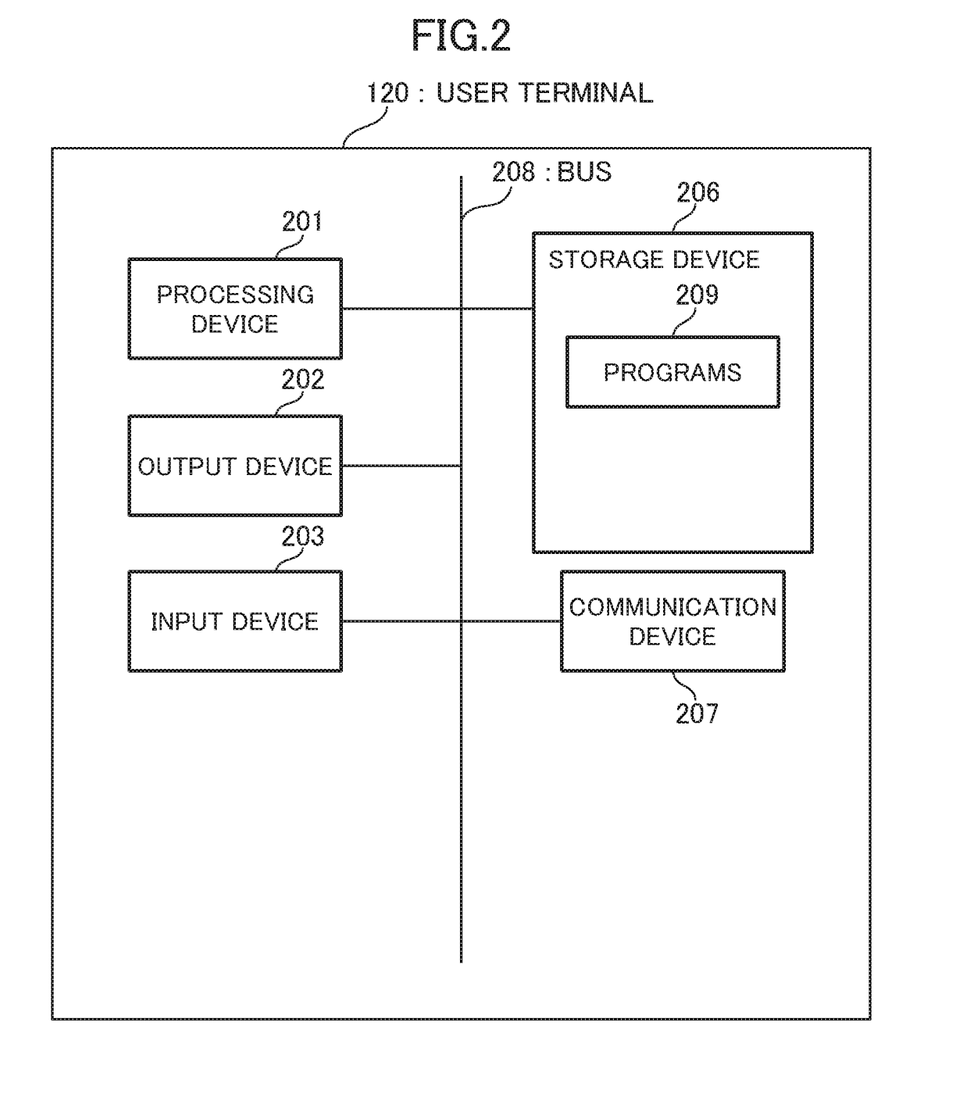
FIG. 2 is a hardware configuration diagram of a user terminal according to the embodiment of the present invention.

The user terminal 120 in this embodiment is a device that executes a game program while communicating with the server 130 via the network 110. For example, the user terminal 120 is an electronic device such as a mobile phone, a smartphone, a tablet terminal, or a portable game machine. As shown in FIG. 2, the user terminal 120 may include a processing device 201, an output device 202, an input device 203, a storage device 206, a communication device 207. The storage device 206 includes programs 209, such as a game program (game app).

The processing device 201 executes various kinds of processing on the basis of the programs 209, data input via the input device 203 or data received from the communication device 207, etc. The processing device 201 includes a processor that controls the individual devices included in the user terminal 120, and the processing device 201 executes various kinds of processing by using, as a work area, a register included in the processor or the storage device 206. These components are connected via the bus 208; alternatively, however, these components may be connected individually as needed. The output device 202 outputs a display and audio for a game screen under the control of the processing device 201. The input unit 203 is a unit that has a function for accepting inputs from a user, such as a touchscreen, a touchpad, or an input button.

The storage device 206 includes a hard disk, a main memory, and a buffer memory. Alternatively, the hard disk may be replaced with any kind of non-volatile storage or non-volatile memory that is capable of storing information and may be of the removable type. For example, in the case where the user terminal 120 is a smartphone, a ROM and a RAM are included. The storage device 206 stores the programs 209 as well as various kinds of data that may be referred to as the programs are executed. The programs 209 include an operating system or programs and data for any kind of application requiring player input, such as a video game or a web browser.

The communication device 207 carries out wireless communication such as mobile communication or wireless LAN communication or wired communication using an Ethernet (registered trademark) cable, a USB cable, or the like. The communication device 207 makes it possible to download a program from the server 130 and to store the program in the storage device 206. Alternatively, it is possible to store a program in an optical disk, such as a CD or a DVD, connect the optical drive to the communication device 207, read the program, etc. from the optical disk, and store the program, etc. in the storage device 206.

Figure 3:
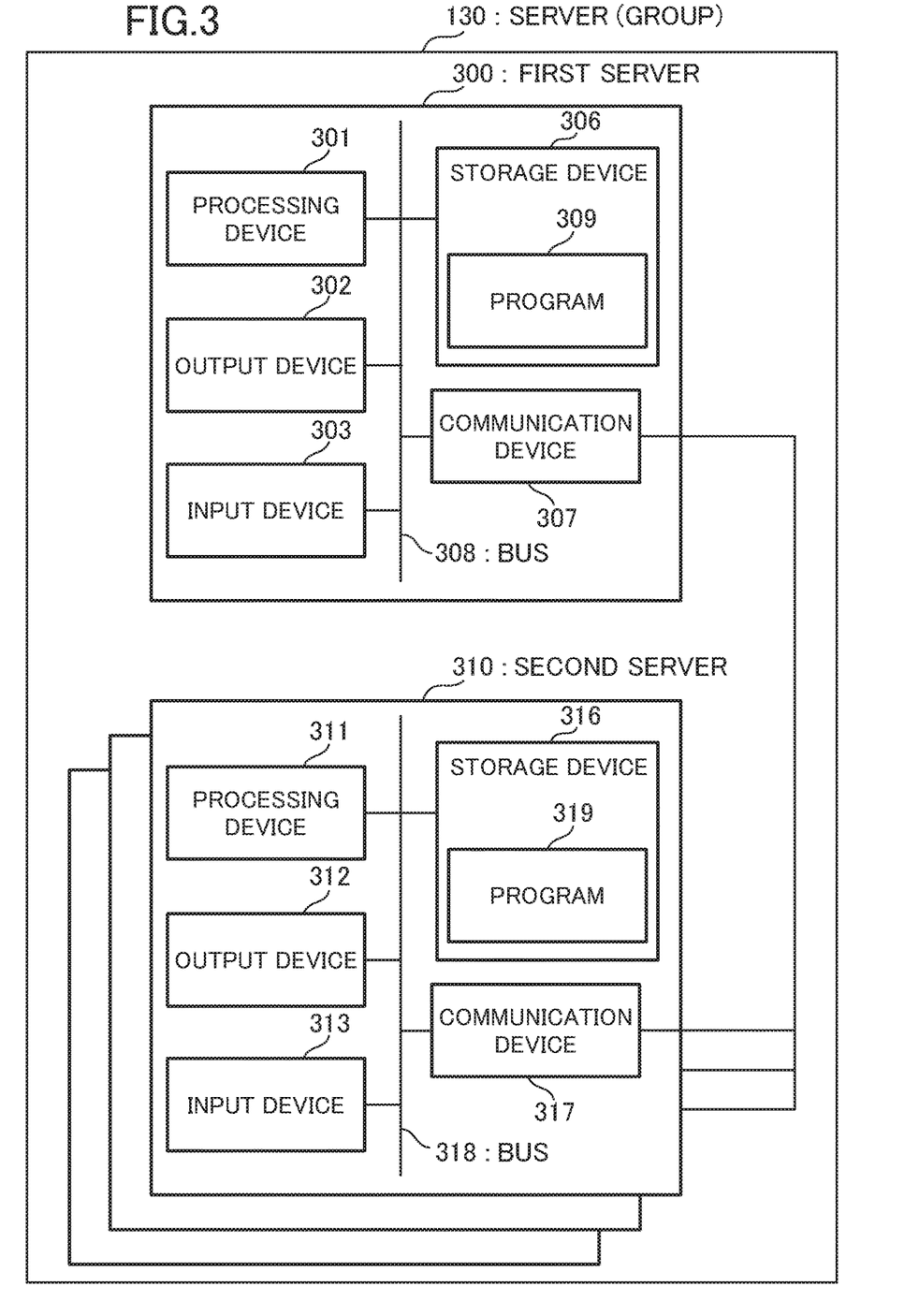
FIG. 3 is a hardware configuration diagram of a server according to the embodiment of the present invention.

FIG. 3 is a block diagram showing the hardware configuration of the server 130 according to this embodiment. Although the server in this embodiment is a server group including one first server 300 and two or more second servers 310, the server may be realized by only a single server device.

The first server 300 and the second servers 310 have the same hardware configuration, and respectively include processing devices 301 and 311, output devices 302 and 312, input devices 303 and 313, storage devices 306 and 316, and communication devices 307 and 317. These components are connected via buses 308 and 318; alternatively, however, these components may be connected individually as needed. The first server and the second servers are connected via the respective communication devices 307 and 317 thereof.

The processing units 301 and 311 include processors that control the individual devices included in the first and second servers 300 and 311, and executes various kinds of processing by using the storage devices 306 and 316 as work areas. The output units 302 and 312 have functions for displaying information to users of the server. The input devices 303 and 313 are devices that have functions for accepting inputs from the users, such as keyboards or mice.

The storage devices 306 and 316 include hard disks, main memories, and buffer memories. The hard disks store programs 309 and 319. Alternatively, the hard disks may be replaced with any kind of non-volatile storage or non-volatile memory, which may be of the removable type, that is capable of storing information. The storage devices 306 and 316 store the programs 309 and 319 as well as various kinds of data that may be referred to as these programs are executed. The communication devices 307 and 317 connect to the network 110 by carrying out wired communication using Ethernet (registered trademark) cables or the like or wireless communication such as mobile communication or wireless LAN communication.

Figure 4:
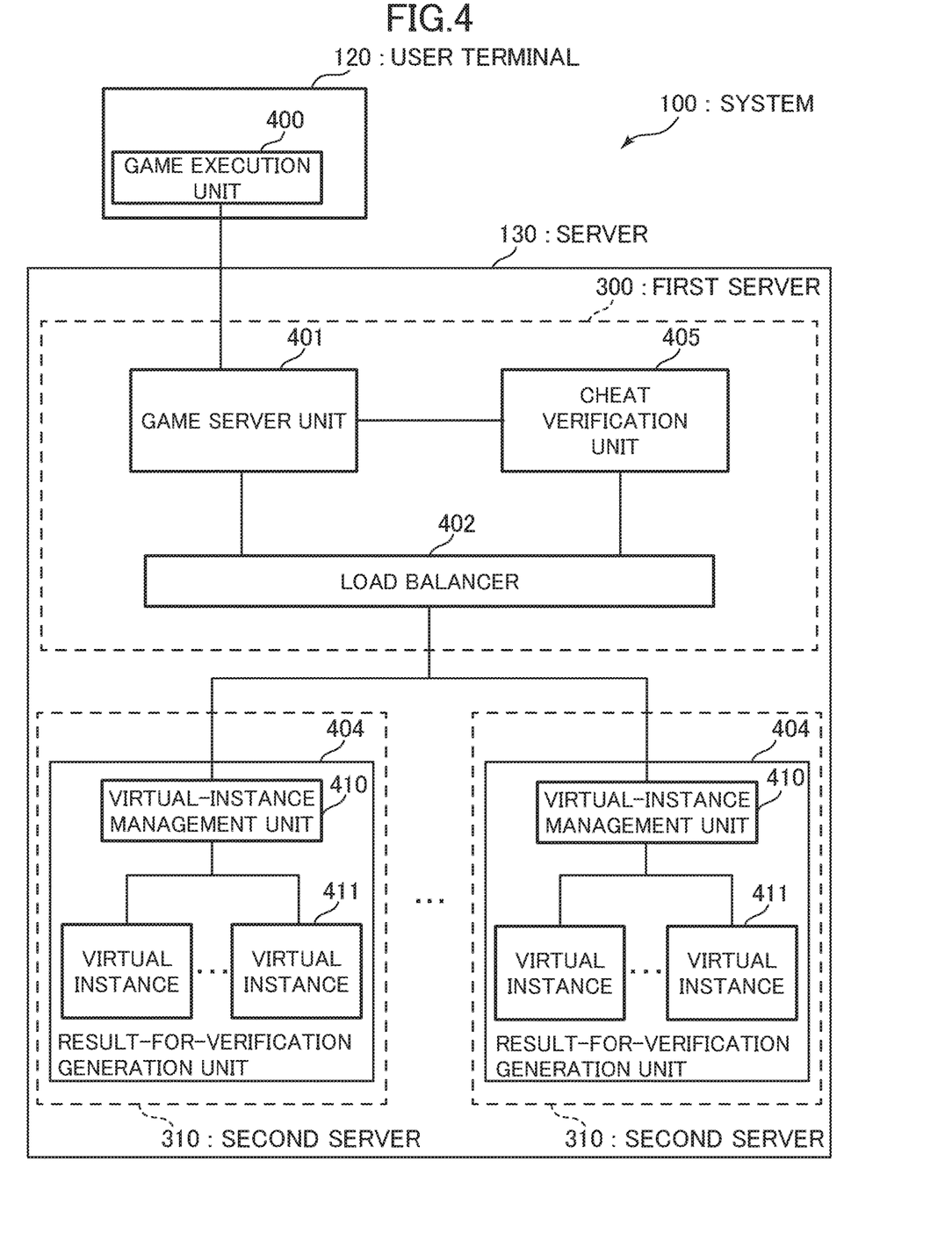
FIG. 4 is a functional block diagram of the system according to the embodiment of the present invention.

FIG. 4 shows an example functional block diagram of a system 100 according to the present invention. The user terminal 120 includes a game execution unit 400. The server 130 includes a game server unit 401, a load balancer 402, result-for-verification generation units 404, and a cheat verification unit 405. In this embodiment, the first server 300 includes the game server unit 401, the load balancer 402, and the cheat verification unit 405, and the second servers include the result-for-verification generation units 404. The server 130 includes a plurality of second servers, and each of the second servers includes a result-for-verification generation unit 404. In other embodiments, each of the functional units may be included in one of one or more server devices, and any of the functional units may be included in any of the server devices. For example, the second servers may include the cheat verification unit 405, or a third server including the cheat verification unit 405 may be provided. Alternatively, all of the functional units may be included in a single server.

The game execution unit 400 of the user terminal 120 runs a game on the basis of a game program, game data, etc. The game execution unit 400 generates a certain event at a certain timing, determines event parameters on the basis of input from the user, etc., sends the event parameters to the game server unit 401, executes the event to generate an event result, and sends the event result to the game server unit 401. The event result is presented to the user via the output device 202.

The game server unit 401 accepts accesses from the individual user terminals 120 and provides a game service via a network. For example, the game server unit 401 provides a service in which, for example, data such as the game progress statuses of users are stored in association with individual user IDs, the data are sent to the user terminals 120 in response to requests, and in a battle game or the like with another player, input information is sent to and received from the other player. The load balancer 402 assigns a request for executing result-for-verification generation processing based on the event parameters received from the game execution unit 400 by the game server unit 401 to one of the plurality of result-for-verification generation units 404.

The result-for-verification generation unit 404 generates a result for verification on the basis of the event parameters and sends the result for verification to the cheat verification unit 405. The result for verification is an event result generated for the purpose of cheat detection. The result-for-verification generation unit 404 includes a virtual-instance management unit 410 and a plurality of virtual instances 411. In order to execute the result-for-verification generation processing assigned by the load balancer 402, the virtual-instance management unit 410 selects one of the plurality of virtual instances 411 of the result-for-verification generation unit 404 including the virtual-instance management unit 410.

The virtual instances 411 are virtual instances for virtualizing the user terminal. For example, the virtual instances 411 can be realized by using an operating-system-level virtualization technology called "container" in docker (registered trademark) or the like. docker (registered trademark) makes it possible to control a Linux (registered trademark) container provided by the Linux kernel so as to attain per-process virtualization, i.e., so as to provide a space in which the use of a CPU and the use of a file system are separated from other processes. Since containers are mutually separated, it becomes possible for each container to act as if the container were the only game app running on the operating system. Thus, it is possible to realize the virtual execution of game programs at a user terminal by causing individual containers to execute game programs so as to activate the processes of the game programs. Therefore, it is possible to generate a plurality of virtual instances at a single server device and to separately and simultaneously execute a plurality of game programs in parallel, thereby generating results for verification. In this embodiment, "containers" in docker (registered trademark) are used as the virtual instances 411.

The result-for-verification generation processing by the virtual instance 411 is executed by executing a game program at the server 130 in a headless mode, the game program being a game program that is executed in order to play a game at the user terminal 120. In this embodiment, the headless mode refers to a mode in which graphics processing that involves access to a GPU is disabled, and also sound processing that involves access to an audio source chip as well as processing for access to an external server are disabled. This makes it possible to execute a game in a state where only a CPU, a memory, and a secondary storage device are used, i.e., only with accesses to resources enclosed within a container. Thus, it becomes possible to exclude speed limiting factors (factors that determine the speed), such as the speed of animation processing presupposing human viewing and the speed of audio playback presupposing human hearing. Furthermore, considering that these graphic devices and sound devices are generally implemented as external devices outside a CPU, it is also possible to save wait time for synchronization, which is required in I/O processing between the CPU and the external devices. This makes it possible to run a game at high speed with no-wait processing, which depends only on the processing speed of a CPU itself, in which effects for humans or wait processing for synchronization with external devices are omitted.

In the present invention, executing a game program in the headless mode may be either executing a game program in the headless mode or executing a headless game program. The manner of execution may be arbitrary as long as it is possible to run a game in a headless state. With Unity, which is a widely adopted game engine, it is possible to readily generate a headless game program just by selecting the headless mode from a GUI. That is, it is possible to readily prepare a game program for cheat detection by reusing a game program for the user terminal 120.

The cheat verification unit 405 performs cheat verification by comparing the user result received from the user terminal 120 via the game server unit 401, which is the result of the event executed by the user terminal 120, with the result for verification generated by the result-for-verification generation unit 404. A difference of at least a certain degree between these results indicates that the event result has been tampered with at the user terminal 120 as a result of an illegitimate information change or the like by the user.

In this embodiment, the individual functional units are realized by executing the programs included in the hardware configurations shown in FIGS. 2 and 3 by the processing devices so that the individual hardware of the output devices, the input devices, the storage devices, and the communication devices, as well as the software, cooperate. Alternatively, however, the individual functional units may be realized by providing electronic circuits or the like corresponding to the individual functions.

Figure 5:
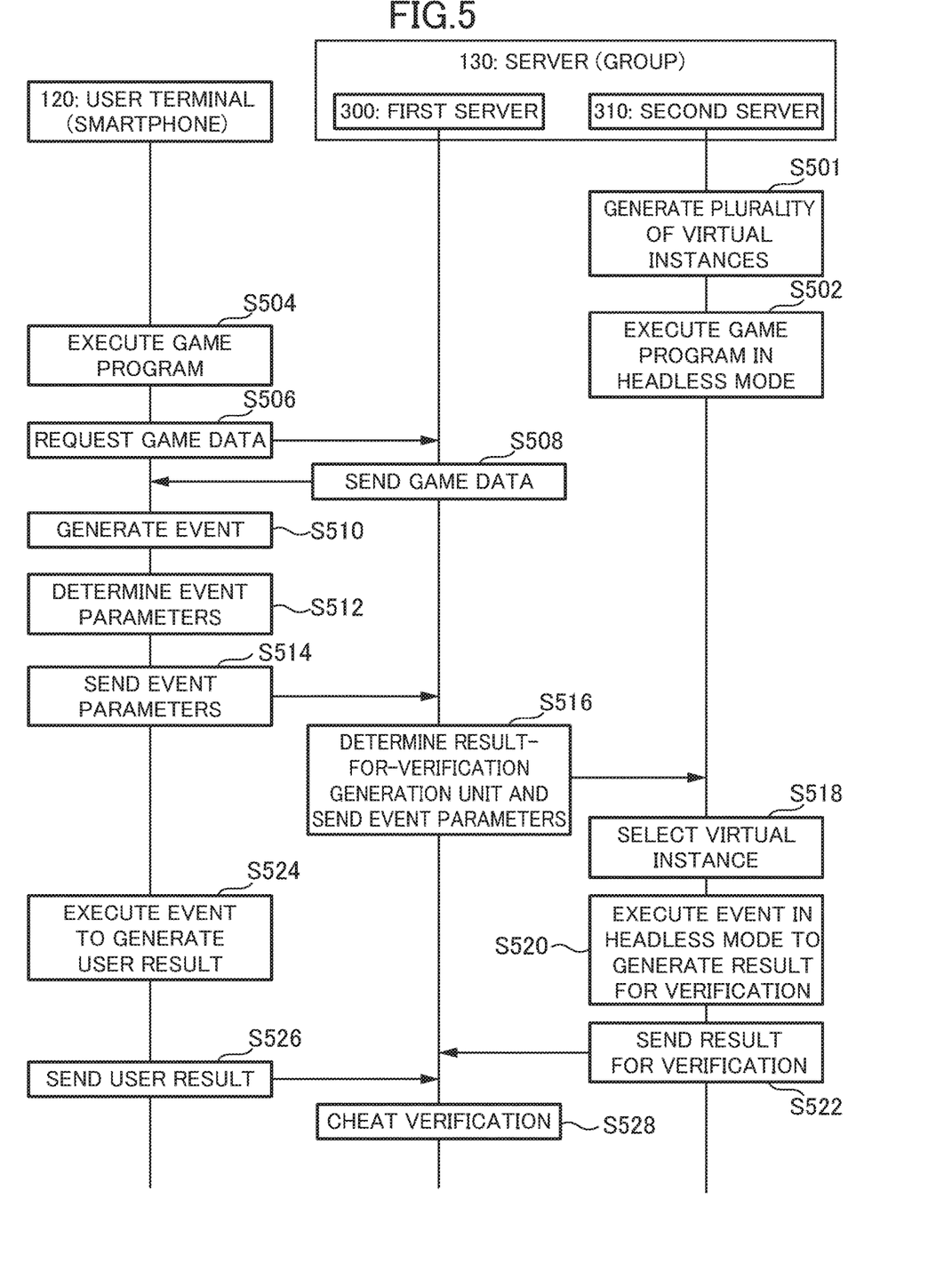
FIG. 5 is a flowchart showing information processing according to the embodiment of the present invention.

Next, FIG. 5 shows a flowchart of the operation of the user terminal 120 and the server (group) 130 in this embodiment. The server (group) 130 includes the first server 300 and the second servers 310. Although it is assumed that a plurality of second servers 310 are provided in this embodiment, FIG. 5 shows only a single second server 310 for the purpose of simplification.

At the second servers 310, first, a plurality of virtual instances 411 are generated (S501), game programs are executed in the headless mode by the generated plurality of virtual instances 411 to activate processes for the game programs (S502), and the reception of event parameters from the user terminal 120 is awaited. The game programs are the same as the game program executed at the user terminal 120 except in that the game programs are executed in the headless mode. The maximum number of game programs that can be simultaneously executed by the second servers 310 is estimated in advance, and processes for the game programs virtualized with containers serving as the virtual instances 411 are activated within the maximum number serving as the upper limit.

The game in this embodiment is a card battle game in which a computer acts as an opponent (NPC), and an event is a battle against the opponent. Alternatively, however, the opponent may be another player, and the present invention may be similarly embodied for a different kind of game. Furthermore, it is assumed here that the battle is an auto battle and that the battle automatically progresses and is terminated on the basis of parameters determined on the basis of user input, etc. at the start of the battle. However, even in the case where event parameters are added, updated, or otherwise changed as a result of user input or the like after the start of the game, it is possible to similarly realize the present invention by sending the event parameters to the server 130 when the need arises.

At the user terminal 120, after downloading the game program and installing the game program in the user terminal 120, setting is made so that the game can be played. Then, when the game program is executed (S504), a request for necessary game data is sent to the server 130 (S506). Upon receiving the game data request, the game server unit 401 of the first server 300 sends the game data for the user to the user terminal 120 (S508).

The user terminal 120 receives the game data and starts advancing the game. As the game advances, an event is generated at a certain timing (S510). It is assumed here that the event is a battle with an opponent (NPC) that is automatically controlled by the game program. The player plays the battle with another player by using a set of cards including a predetermined number of cards selected from a plurality of cards that the player owns. When the battle occurs, the NPC determines its set of cards to be used for the battle, and the user determines his or her set of cards. The user terminal 120 determines parameters including these determined set of cards (S512) and sends the parameters to the server 130 (S514).

Upon receiving the parameters, the first server 300, by using the load balancer 402, assigns the result-for-verification generation processing for the event to one of the plurality of result-for-verification generation units 404, for example, in a round-robin fashion, and sends the event parameters to the second server 310 that serves as the assignee result-for-verification generation unit 404 (S516).

The result-for-verification generation unit 404 in this embodiment can simultaneously execute the result-for-verification processing a number of times equal to the number of the generated virtual instances 411. Furthermore, the result-for-verification generation processing is completed within a short period, such as 1/n-th (where n is a few to a few tens) of the battle duration in the game, and then it becomes possible to accept a new request for processing. Since this behavior differs from the behavior of a conventional web server or the like, it is preferable to set a load balancer 402 suitable for this embodiment. In a conceivable implementation, the load balancer 402 distributes tasks, for example, in a round-robin fashion, so as to evenly assign tasks to the virtual instances 411 of the individual second servers 310, allows retries by all the servers 310 if an error indicating a capacity excess then occurs at one of the second servers 310, and generates an error only when the capacities of all the servers 310 are exceeded. In another conceivable implementation, in order to assign tasks immediately and evenly to available instances of the virtual instances 411 of the individual second servers 310, for example, the load balancer 402 has a queue for storing the IP addresses of available second servers 310, and when a notification of completion of processing is issued by one of the second servers 310, the load balancer 402 adds the server to the tail of the queue, and as requests arrive, the load balancer 402 assigns the requests in order from the head of the queue. In a conceivable implementation, an error is generated only when a request arrives while this queue is empty.

The second server 310 to which the result-for-verification generation processing has been assigned receives the event parameters serving as a result-for-verification generation request, and selects one of the plurality of virtual instances 411 in order to generate a result for verification on the basis of the event parameters (S518). In this embodiment, the virtual-instance management unit 410 manages the virtual instances 411 by asynchronous I/O. Specifically, the result-for-verification generation unit 404 of the second server 310 includes a single virtual-instance management unit 410, and the virtual-instance management unit 410 determines the operation status of virtual instances operating in parallel on the basis of input/output interrupt signals from the virtual instances to search for available virtual instances 411 while executing another event by a virtual instance selected from among the virtual instances operating in parallel, and selects one of the available virtual instances 411 as a virtual instance 411 for executing an event.

In this embodiment, communication between the first server 300 and the processes in the virtual instances 411 is carried out via a file. More specifically, the second server 310 receives the event parameters from the first server 300, for example, in the form of a JSON file storing the individual parameters, and writes the event parameters to a specific file path. The processes in the virtual instances 411 monitor the specific file path, and when the file is written, the processes read the file as event parameters, execute the event, and write results for verification in a separate file. Then, the separate file is sent to the first server 300. The present invention may also be embodied by using other methods, such as interprocess communication via a pipe.

Here, if there is any case where results having at least a certain degree of similarity are not returned as the user result and the result for verification even if no cheating is conducted, it is not possible to accurately detect cheating by the user just by comparing the user result with the result for verification. In this description, in the case where results having at least a certain degree of similarity are returned when the same argument is given, it is said that there is result matching, whereas in the case where results having at least a certain degree of similarity are not returned when the same argument is given, it is said that there is no result matching. That is, unless the process that executes an event by using the event parameters determined by the game program executed at the user terminal 120 and the process executed by the game program executed in the headless mode in the container serving as a virtual instance 411 at the server 130 have result matching, it is not possible to accurately detect cheating just by comparing a user result with a result for verification.

In this embodiment, the game program executed at the user terminal 120 is mounted at one of the directories in the file system of the server 130 in order to write information such as the event parameters. The container serving as a virtual instance 411 is also mounted at one of the directories in the file system of the server 130. Here, it is assumed that the container is referred to in a read-only mode with the mounted directory.

In order to select a container having result matching with the game program at the user terminal 120, containers are identified on the basis of type information indicating the kinds of game programs executed by the containers and information indicating the directories mounted in the containers. Then, a container having the same type information as the game program executed at the user terminal 120 is selected as a container having result matching. The information indicating the kind of game program is information indicating the kind of game, the version of the game program, etc. The information indicating the directory mounted in a container may be the "path" for mounting the file system of the server 130 from the container. That is, there is result matching in the case where the kinds of game programs executed by the user terminal 120 and a container are the same and the user terminal 120 and the container are mounted at the same directory, and a container having such result matching is selected.

Table 1 shows classification about a method of verifying result matching in accordance with whether a directory at which a container serving as a virtual instance 411 is mounted is referred to or is copied and whether or not the directory is accessed in the read-only mode or the read-write mode. As shown in this table, through verification of result matching in accordance with the characteristics of game programs, it is possible to select a container having result matching with the game program executed at the user terminal 120.

TABLE 1

|  | Reference | Copy |
| --- | --- | --- |
| Read-Only | There is result matching if the "type" of container is the same and no other program performs writing to the directory. | There is result matching if the copied "content" as well as the "type" of container are the same. |
| Read-Write | No result matching. | There is result matching if the copied "content" as well as the "type" of container are the same and content changes are mutually synchronized. |

In Table 1, "Reference" indicates that a container refers to a server directory mounted in the container, and "Copy" indicates that a container copies a mounted server directory as well as files into a container image. Read-Only indicate that a process in a container accesses a mounted directory in the read-only mode, and Read-Write indicates that a process in a container accesses a mounted directory in the read-write mode.

That is, in the case where the kind of game program executed and the information indicating the version are the same between the user terminal 120 and a container, and there is result matching with the game program executed at the user terminal 120 if a process in a container that performs "reference" to the same directory as the directory in the server 130 in which the event parameters sent from the user terminal 120 are written performs access in the read-only mode, whereas there is no result matching if the process performs access in the read-write mode. Furthermore, in the case where a container copies a directory in the second server 310 in which the event parameters sent from the user terminal 120 are written and a process performs access in the read-only mode, there is result matching if the copied file is the same. In the case where a process performs an access in the read-only mode, there is result matching if the copied "content" is the same and content changes are mutually synchronized.

In the embodiment described above, since a container refers to a mounted directory in the read-only mode, it is possible to select a container (virtual instance 411) having result matching by selecting a container having the same type information as the game program executed at the user terminal 120 on the basis of type information including information indicating the kinds of game programs executed by containers and information indicating the directories mounted on the containers.

Even in the case where access to a directory mounted in a container is not limited to read-only reference, by including, in the type information, information indicating whether a mounted directory is "referred to" or is "copied" as well as information indicating an access mode for the directory, it becomes possible to select a container having result matching in various environments on the basis of the type information, the criteria shown in Table 1, etc., thereby assuring cheat detection.

The second server 310 executes the event in the headless mode on the basis of the event parameters in the process of the selected virtual instance 411 (container) to generate a result for verification (S518), and sends the generated result for verification to the first server 300 (S522). Since it is possible to exclude speed limiting factors (factors that determine the speed) in the headless mode when executing an event, it is possible to generate an event result in a short time.

Figure 6:
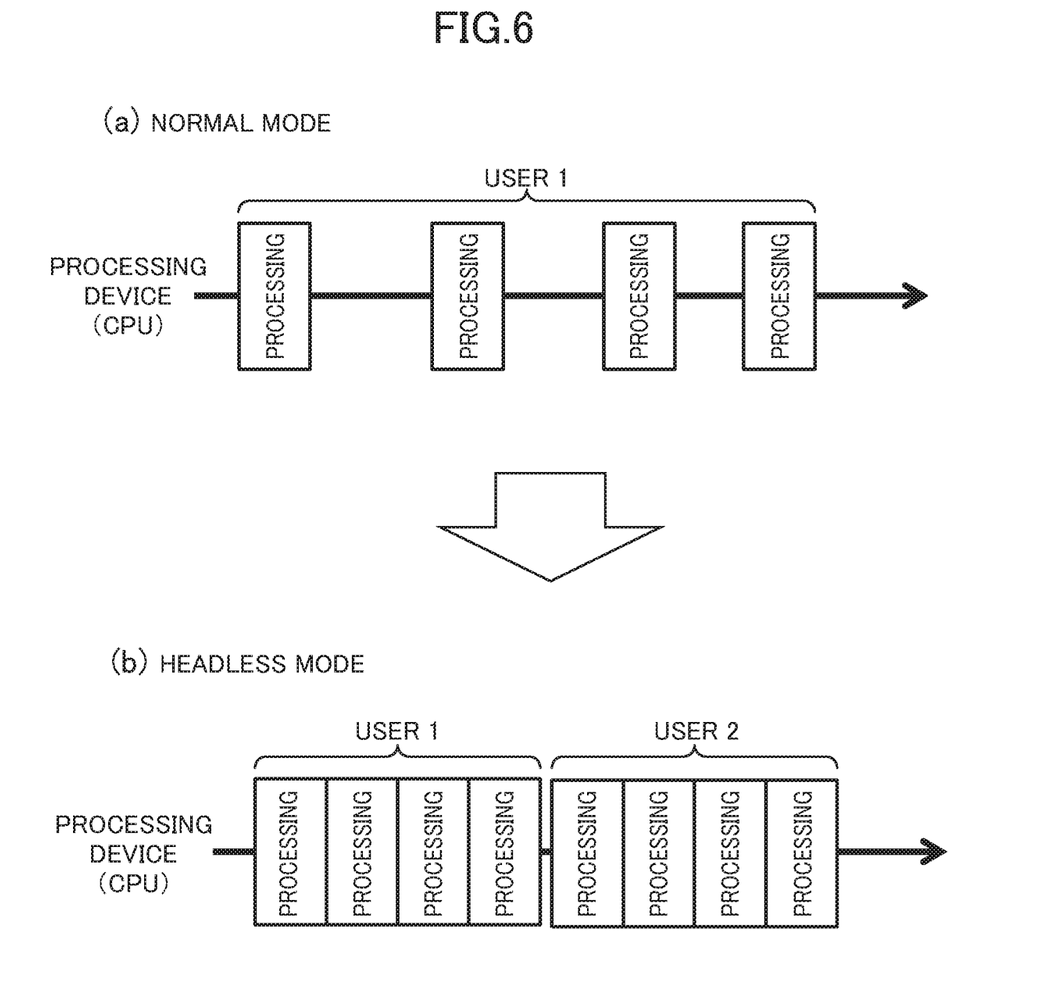
FIG. 6 is a schematic diagram showing the timing of information processing according to the embodiment of the present invention.

This point will be explained in more detail with reference to FIG. 6. In FIG. 6, (a) shows the operation status of the CPU in the case where an event is executed in the normal mode, and (b) shows the operation status of the CPU in the case where an event is executed in the headless mode. As shown in (a), in the normal mode, the CPU does not constantly have a high load, and a high load occurs locally. For example, this corresponds to a portion where data needed for rendering the frames of a game screen is generated. Since music and screen display require adaptation to human perception, waits occur before certain timings are reached. Therefore, in the normal mode, the CPU operates locally with the speed thereof regulated by the real time of the game progress. Meanwhile, in the headless mode, since the GPU and sound, which constitute speed limiting factors, are not required, it is possible with the CPU alone to execute an event at high speed, i.e., in a short time without requiring waits. Thus, it is possible to execute processing that has hitherto been distributed in a short time together, which makes it possible to execute the result-for-verification generation processing for a plurality of players in a period for executing an event for one player in the normal mode, whereby high processing efficiency can be realized.

After sending the event parameters (S514), the user terminal 120 executes the event on the basis of the event parameters to generate an event result (S524). A user result, which is the event result generated at the user terminal 120, is sent to the server 130 (S526). In this embodiment, the event result is a win/lose result of a battle. At the user terminal 120, since battle graphics and audio are output by means of a CPU, a sound source chip, etc. via the output unit 202 of the user terminal 120, these devices constitute speed limiting factors, and thus it takes more time to generate an event result compared with the result-for-verification generation unit 404.

The cheat verification unit 405 of the first server 300 performs cheat verification by comparing the user result generated by the user terminal 120 with the result for verification generated by the result-for-verification generation unit 404 (S528). It is determined that the user result is legitimate if these results are the same and that the user result is illegitimate if these results differ. Strict matching is not necessarily required in the result determination. It is possible to determine that there is no cheating if the results match with each other within a certain range. For example, it is possible to perform determination so as to permit differences in parameters such as damage within certain ranges as long as the win/lose results match with each other. In the case where it is determined that cheating is detected, for example, the cheat verification unit 405 sends a cheat detection signal to the game server unit 401, and the game server unit 401 executes processing such as sending a message indicating that cheating has been detected to the user, the game system administrator, or the like.

In this embodiment, by executing a game program in the headless mode in the result-for-verification generation unit 404, it is possible to execute an event to generate a result at high speed with no waits. Furthermore, it is possible to run a plurality of virtual instances 411 in parallel in the result-for-verification generation unit 404 such that, while an event is being executed on the basis of parameters received by a virtual instance 411 selected from a plurality of virtual instances, an event is executed in parallel by another selected virtual instance on the basis of other received parameters. By preparing a plurality of second servers 310, it is possible to run a greater number of virtual instances in parallel. Thus, it becomes possible to generate results for verification in parallel at high speed, which enables efficient cheat verification for a large number of users. Furthermore, since it is possible to additionally install second servers 310 as needed, it is possible to construct a scalable system.

In the case where a game program executed at the user terminal 120 is executed by a virtual instance 411 in the headless mode, it is possible to use the same game program as that executed at the user terminal 120. In the case where the headless version of the game program executed at the user terminal 120 is used, for example, with Unity, which is a widely adopted game engine, it is possible to readily make settings for headless build just by selecting the headless mode from a GUI. Therefore, even in the case where a game app is changed frequently or in a complex manner, it is possible to readily construct a system for cheat detection adapted to those changes.

Furthermore, by selecting a virtual instance 411 having the same type information as the game program executed at the user terminal 120, it is possible to ensure accurate cheat detection by selecting a container having result matching with the game program executed at the user terminal 120, even in various environments including a plurality of kinds of games, etc.

Furthermore, by simultaneously executing a plurality of different versions of a game program in the headless mode at the server in accordance with the update status of the game program, it is possible to readily realize cheat detection at high speed.

Furthermore, by controlling a game program within a virtual instance, when the game program is updated or assets therein are updated, it is possible to realize live migration, in which migration to a new version is performed while running an existing version of the game program. Furthermore, autoscaling of processing nodes is also easy.

The processing or operation described above may be modified freely as long as no inconsistency arises in the processing or operation. Furthermore, the embodiments described above are examples for explaining the present invention, and the present invention is not limited to those embodiments. The present invention can be embodied in various forms as long as there is no departure from the gist thereof. Furthermore, the advantages described in the context of the embodiment are merely a list of most preferred advantages arising from the present invention, and the advantages of the present invention are not limited to those described in the context of the embodiment.

REFERENCE SIGNS LIST

100 Cheat detection system
110 Network
120 User terminal
130 Game server
201 Processing device
202 Output device
203 Input device
206 Storage device
207 Communication device
208 Bus
209 Programs
300 First server
301 Processing device
302 Output device
303 Input device
306 Storage device
306 Storage device
307 Communication device
308 Bus
309 Programs
310 Second server
400 Game execution unit
401 Game server unit
402 Load balancer
404 Result-for-verification generation unit
405 Cheat verification unit
410 Virtual-instance management unit
411 Virtual instance

The invention claimed is:

1. A system for detecting cheating by a user in a game played at a user terminal, the system being characterized by comprising:
a user terminal that executes a game program for playing a game, that determines a parameter for executing a certain event in the game, that sends the parameter, that executes the event on the basis of the parameter to generate a user result, which is the result of the event, and that sends the user result; and
a server including a result-for-verification generation unit and a cheat verification unit,
wherein the result-for-verification generation unit
generates a plurality of virtual instances for virtualizing the user terminal,
executes the game program in a headless mode in the plurality of virtual instances,
selects, from the plurality of virtual instances, a virtual instance for executing the event on the basis of the parameter received by the server, and
executes the event in the selected virtual instance on the basis of the parameter to generate a result for verification, and
wherein the cheat verification unit compares the user result received from the user terminal with the result for verification to determine whether or not cheating has been conducted at the user terminal.

2. The system according to claim 1, wherein the result-for-verification generation unit executes the event to generate the result for verification while disabling at least graphics processing and sound processing by executing the game program in the headless mode.

3. The system according to claim 1,
wherein, when performing selection from the plurality of virtual instances,
virtual instances are identified on the basis of type information including information indicating the kinds of game programs executed by the virtual instances and information indicating directories mounted in the virtual instances, and
a virtual instance that has the same type information as the game program executed at the user terminal and that generates the same result as the game program when the same parameter as the parameter for the game program is input is selected.

4. The system according to claim 1, wherein:
the result-for-verification generation unit includes a single virtual-instance management unit,
the result-for-verification generation unit causes the plurality of virtual instances to be run in parallel,
the single virtual-instance management unit of the result-for-verification generation unit determines the operation statuses of virtual instances on the basis of input/output interrupt signals from the virtual instances, thereby making it possible to execute an event on the basis of a parameter received by a virtual instance selected from the plurality of virtual instances while selecting another virtual instance and executing an event in parallel on the basis of another received parameter.

5. The system according to claim 1, wherein the virtual instances realize container-based virtualization.

6. The system according to claim 1, wherein:
the server includes a load balancer and a plurality of result-for-verification generation units,
each of the result-for-verification generation units includes a single virtual-instance management unit,
the load balancer assigns the execution of the event based on the received parameter to one of the result-for-verification generation units, and
the single virtual-instance management unit searches for available virtual instances in the result-for-verification generation unit including the single virtual instance management unit and selects one of the available virtual instances as a virtual instance that executes the event assigned to the single result-for-verification generation unit.

7. The server used in a system for detecting cheating by a user in a game played at a user terminal,
wherein the user terminal in the system executes a game program for playing a game, determines a parameter for executing a certain event in the game, sends the parameter, executes the event on the basis of the parameter to generate a user result, which is the result of the event, and sends the user result,
the server being characterized in that the server:
generates a plurality of virtual instances for virtualizing the user terminal,
executes the game program in a headless mode in the plurality of virtual instances,
selects, from the plurality of virtual instances, a virtual instance for executing the event on the basis of the parameter received by the server, and executes the event in the selected virtual instance on the basis of the parameter to generate a result for verification in order to determine whether or not cheating has been conducted at the user terminal by comparing the result for verification with the user result.

8. The server according to claim 7,
wherein whether or not cheating has been conducted at the user terminal is determined by further comparing the user result received from the user terminal with the result for verification.

9. A non-transitory computer readable medium storing a program executed by a server in a system for detecting cheating by a user in a game played at a user terminal, wherein the user terminal in the system executes a game program for playing a game, determines a parameter for executing a certain event in the game, sends the parameter, executes the event on the basis of the parameter to generate a user result, which is the result of the event, and sends the user result, the program being characterized by causing the server to execute:
- a step of generating a plurality of virtual instances for virtualizing the user terminal,
- a step of executing the game program in a headless mode in the plurality of virtual instances,
- a step of selecting, from the plurality of virtual instances, a virtual instance for executing the event on the basis of the parameter received by the server, and
- a step of executing the event in the selected virtual instance on the basis of the parameter to generate a result for verification in order to determine whether or not cheating has been conducted at the user terminal by comparing the result for verification with the user result.

10. A method executed in a system for detecting cheating by a user in a game played at a user terminal, the method being characterized in that:
the user terminal executes a game program for playing a game, determines a parameter for executing a certain event in the game, sends the parameter, executes the event on the basis of the parameter to generate a user result, which is the result of the event, and sends the user result,
wherein a result-for-verification generation unit
generates a plurality of virtual instances for virtualizing the user terminal,
executes the game program in a headless mode in the plurality of virtual instances,
selects, from the plurality of virtual instances, a virtual instance for executing the event on the basis of the parameter received by a server, and
executes the event in the selected virtual instance on the basis of the parameter to generate a result for verification, and
wherein a cheat verification unit compares the user result received from the user terminal with the result for verification to determine whether or not cheating has been conducted at the user terminal.

11. A method executed by a server in a system for detecting cheating by a user in a game played at a user terminal,
wherein the user terminal included in the system executes a game program for playing a game, determines a parameter for executing a certain event in the game, sends the parameter, executes the event on the basis of the parameter to generate a user result, which is the result of the event, and sends the user result,
the method being characterized in that the server
generates a plurality of virtual instances for virtualizing the user terminal,
executes the game program in a headless mode in the plurality of virtual instances,
selects, from the plurality of virtual instances, a virtual instance for executing the event on the basis of the parameter received by the server, and
executes the event in the selected virtual instance on the basis of the parameter to generate a result for verification in order to determine whether or not cheating has been conducted at the user terminal by comparing the result for verification with the user result.

* * * * *